United States Patent
McGivern et al.

(10) Patent No.: US 6,521,077 B1
(45) Date of Patent: Feb. 18, 2003

(54) METHOD FOR INSULATING A CRYOGENIC CONTAINER

(75) Inventors: Kenneth James McGivern, Cohoes, NY (US); David R. Barber, Clifton Park, NY (US); Kathleen M. Amm, Clifton Park, NY (US)

(73) Assignee: Lydall, Inc., Manchester, CT (US)

( * ) Notice: Subject to any disclaimer, the term of this patent is extended or adjusted under 35 U.S.C. 154(b) by 0 days.

(21) Appl. No.: 09/275,790

(22) Filed: Mar. 25, 1999

(51) Int. Cl.[7] .................................................. B29C 65/00
(52) U.S. Cl. ............................... 156/304.1; 156/304.3; 428/76; 428/156; 220/560.12; 220/560.13; 220/592.2; 220/592.21; 220/592.26
(58) Field of Search .................................. 156/222, 297, 156/300, 301, 304.1, 304.3, 313, 285, 286; 428/68–69, 76, 156, 170–172, 192; 220/560.12, 560.13, 592.09, 592.11, 592.2, 592.21, 592.22, 592.23, 592.24, 592.26, 592.27

(56) References Cited

U.S. PATENT DOCUMENTS

| | | | |
|---|---|---|---|
| 3,241,702 A | | 3/1966 | Navikas ........................ 220/9 |
| 3,264,165 A | | 8/1966 | Stickel |
| 3,379,330 A | * | 4/1968 | Perkins ......................... 220/9 |
| 3,540,615 A | | 11/1970 | Paine |
| 3,713,560 A | * | 1/1973 | Slysh et al. ................. 137/343 |
| 4,104,783 A | | 8/1978 | Schultz et al. ................. 29/451 |
| 4,323,620 A | | 4/1982 | Iwabuchi et al. ............. 428/215 |
| 4,378,403 A | | 3/1983 | Kotcharian ................. 428/251 |
| 4,444,821 A | | 4/1984 | Young et al. ................. 428/69 |
| 4,726,974 A | | 2/1988 | Nowobilski et al. ........... 428/69 |
| 4,741,456 A | | 5/1988 | Faudou et al. ............... 220/414 |
| 4,915,988 A | | 4/1990 | Erbil |
| 5,024,210 A | * | 6/1991 | Nelson ....................... 122/19.2 |
| 5,556,682 A | * | 9/1996 | Gavin et al. .................. 428/74 |
| 5,590,054 A | | 12/1996 | McIntosh .................... 364/505 |
| 5,660,924 A | | 8/1997 | Yamaji et al. ............... 442/378 |
| 5,749,537 A | | 5/1998 | Muzio, Jr. et al. ......... 242/439.5 |
| 5,953,818 A | * | 9/1999 | Matthews et al. ........ 29/890.144 |
| 5,987,833 A | * | 11/1999 | Heffelfinger et al. ......... 383/211 |

FOREIGN PATENT DOCUMENTS

| | | |
|---|---|---|
| DE | 37 02 214 A 1 | 11/1987 |
| DE | 197 25 818 A 1 | 12/1998 |
| EP | 0 715 117 A2 | 5/1996 |

OTHER PUBLICATIONS

Y.M. Eyssa et al. "Thermodynamic Optimization of Thermal Radiation Shields for a Cryogenic Apparatus", *Cryogenics*, Jul. 1978, pp. 2–4.
Storing and Transporting Liquefied Gases, *Cryogenic Engineering*, pp. 2–3.

* cited by examiner

Primary Examiner—Michael W. Ball
Assistant Examiner—Jessica Rossi
(74) Attorney, Agent, or Firm—Birch, Stewart, Kolasch & Birch, LLP

(57) ABSTRACT

A method of insulating a member, such as a cryogenic tank, pipe, or other cryogenic or extreme temperature element with multilayer insulation, and a packaged multilayer insulation blanket for use in the method. The packaged blanket includes (1) a multilayer insulation blanket including a plurality of alternating layers of aluminum or other heat-reflective foil and microfiberglass insulation spacer material, and (2) two layers of plastic sheeting sandwiching the multilayer insulation blanket therebetween. Each layer of plastic sheeting has at least one edge which is sealed to thus define an evacuated inside space containing the multilayer insulation. In the method, the edge of the packaged insulation is opened and an edge of the multilayer insulation blanket therein is attached to the cryogenic tank, container or other member to be insulated. The multilayer insulation is then guided onto or around the member, and out from between the plastic sheeting until edges of the multilayer insulation abut. Lastly, the abutting edges of the multilayer insulation blanket are attached with an appropriate means such as heat reflective tape in a manner to avoid "heat shorts".

27 Claims, 5 Drawing Sheets

METHOD FOR INSULATING A CRYOGENIC CONTAINER

FIELD OF THE INVENTION

The present invention relates to a method of insulating a member, such as a cryogenic tank, pipe, or other cryogenic or extreme temperature member with multilayer insulation, and a packaged multilayer insulation blanket for use in the method.

BACKGROUND OF THE INVENTION

Multilayer insulation has been used for quite some time to insulate cryogenic tanks, cryogenic pipes, and other cryogenic or extreme temperature containers, members or elements such as superconducting magnet assemblies or power distribution devices, etc. Multilayer insulation for the above purposes is described, for example, in U.S. Pat. No. 5,590,054 to McIntosh. This patent describes a variable density multilayer insulation formed of alternating layers of separator materials such as glass fiber materials, and heat radiation barriers such as metal foil, such as copper or aluminum foil, or double aluminized Mylar (DAM).

It has also been known, prior to the above McIntosh patent, that thermal radiation heat transfer, as defined by the Stephan-Boltzmann law, that heat transfer between parallel surfaces is a function of the emissivities of the surfaces and the warm absolute temperature taken to the fourth power against the cold absolute temperature taken to the fourth power. Because of the powerful effect of raising the temperatures to the fourth power, the impact of radiation between radiation barriers near a cold wall of a cryogenic vessel drops dramatically from the impact of radiation between radiation barriers near the vessel's warm wall. Correspondingly, the temperature difference between the reflective barriers increases as the cold wall is approached. Thus, when cryogenic multilayer insulation is used to insulate between the inner and outer vessels of a Dewar vessel system, the heat reflective layers near the cold wall of the inner vessel are spaced further apart than the heat reflective layers closer to the warm wall. For this reason, prior methods of wrapping cryogenic containers using an orbital or wrapping method are not necessarily optimized for thermal performance, because these methods are unable to produce variable density multilayer insulation of the highest thermal efficiency.

Because the advantages of multilayer insulation have long been known, many methods have been proposed to simplify the installation of such multilayer insulation on large containers or tanks.

U.S. Pat. No. 4,104,783, to Schultz, et al., for example, discloses a method of installing multilayer insulation on the outside of a tank, by winding insulation and wire mesh around a cryogenic tank to form such a structure. A similar method is also disclosed in U.S. Pat. No. 3,241,702, to C. R. Navikas. By this latter method, alternating layers of glass fiber sheet material and perforated aluminum foil are wrapped around a cryogenic tank using a relatively complicated assembly of rollers, tensioners and apparatuses for holding and turning the containers or tank to be insulated. The multilayer insulation is wrapped around the container in a manner such that the ends of the insulation extend beyond the dimensions of the container and can be folded down and taped in place to insulate the entire container. An inner container thus wrapped is then inserted in an outer container to form a Dewar vessel construction.

More sophisticated methods of insulating cryogenic containers or vessels are disclosed in U.S. Pat. No. 4,741,456, to Faudou, et al., and U.S. Pat. No. 5,749,537, to Muzio, Jr., et al. The above Faudou., et al. patent discloses a method in which several insulating layers are helically wound around a tank which is supported and rotated about an axis by a shaft.

The Muzio, et al. patent discloses a number of prior art methods of wrapping cryogenic insulation around an inner tank of a Dewer vessel system in which alternating layers of cryogenic insulation paper and foil are wrapped around the tank in what is referred to as "serial wraps." Each wrap consists of insulating paper spacer with metal foil centered thereon. An edge portion of the insulating paper abuts an edge portion of an adjacent layer or slightly overlaps the adjacent layer. While alternating layers of foil are slightly narrower in width than the insulated paper so that the edges do not contact one another. By this serial wrapping technique, it is ensured that alternating layers of insulating paper and foil are provided without significant "heat shorts" in which the cold side of one foil layer contacts the hot side of an adjacent foil layer. This method also requires considerably complicated and expensive machinery for holding the container to be insulated, for adjusting tension on the separately stored paper and foil layers and a frame suitable of supporting the entire apparatus. As can be appreciated by viewing the apparatus of Muzio, Jr., et al., a complicated and unwieldy drive means is provided including shafts, drives, translation devices, and tension devices, as well as a suitable braking system for providing adjustable tension control for the various rollers, and a frame for supporting the rollers, container, etc. Such large and complicated apparatuses are certainly not easily applicable to every situation in which a cryogenic container or other member needs to be wrapped with multilayer insulation. In addition, considerable skill and specialized training is required to operate the apparatus. Also, the Muzio, Jr. method, like other prior art methods can not easily be applied to thermally efficient, variable layer multilayer insulation.

It is therefore an object of the present invention to provide a method of insulating a cryogenic member such as a cryogenic container or tank, cryogenic pipe, or other cryogenic or extreme temperature member with multilayer insulation with a minimum of expense, in order to solve the problems of the prior art.

It is further object of the present invention to provide a method of insulating a cryogenic member such as a cryogenic container or tank, cryogenic pipe, or other cryogenic or extreme temperature member quickly, efficiently, and without the need for special equipment.

It is a particular object of the present invention to provide a method of insulating a cryogenic member such as a cryogenic container or tank, cryogenic pipe, or other cryogenic or extreme temperature member that is superior to the spiral or orbital wrapping technique conventionally used. The present invention strives for a method that avoids the labor- and time-intensive method of carefully rolling foil and spacer material onto the vessel without creating leaks or heat shorts.

It is a still further object of the invention to provide a method which can vary the thickness and/or quantity of spacer material between layers in any desired fashion.

It is also an object of the present invention to provide a packaged multilayer insulation and a method of packaging and producing fragile, multilayer insulation, particularly variable density multilayer insulation blankets or composites, which can be easily transported without damage and applied without special training and without significant time, labor, or complicated apparatuses.

It is also an object of the present invention to provide a method of packaging and a packaged insulation wherein the multilayer insulation is packaged and can be transported with low or no moisture content so that any subsequent evacuation required during the installation of the insulation is simplified.

BRIEF SUMMARY OF THE INVENTION

In accordance with the present invention, and in order to solve the above and other objects, the present invention provides a method of insulating a member, such as a cryogenic tank, pipe, or other cryogenic or extreme temperature element with multilayer insulation, and a packaged multilayer insulation blanket for use in the method.

According to the present invention, a method is provided of insulating a member with multilayer insulation, comprising the following steps. First, a packaged multilayer insulation blanket is provided. The packaged blanket includes (1) a multilayer insulation blanket including a plurality of alternating layers of heat-reflective foil and insulation spacer material, and (2) two layers of plastic sheeting sandwiching the multilayer insulation blanket therebetween, each layer having at least one edge, wherein the edge of the plastic sheeting is sealed to thus define an inside space containing the multilayer insulation. The inside space is preferably evacuated, partially evacuated, purged of air with an inert gas, or otherwise kept dry or in a low moisture state. Second, the edge of the packaged insulation is opened and an edge of the multilayer insulation blanket is attached to the member to be insulated. Third, the multilayer insulation is guided onto or around the member, and out from between the plastic sheeting until edges of the multilayer insulation blanket abut. Lastly, the abutting edges of the multilayer insulation blanket are attached with any appropriate means such as heat reflective tape, or other fasteners. Preferably, reflective tape is used to ensure that no leaks or "heat shorts" result after the insulation is applied. The member to be insulated by the method according to the present invention can be a cryogenic container, such as the inner container of a Dewar structure having an inner container, an outer container, and evacuated space therebetween. The member can also be a cryogenic pipe, a heat shield for a spacecraft, superconducting power distribution equipment, such as superconducting magnets, or any one of a number of cryogenic or extreme temperature applications.

The heat reflective foil of the multilayer insulation is preferably aluminum foil, but can be any other suitable material such as double aluminized Mylar (DAM). The insulation spacer material is preferably microfiberglass insulation.

The method, in a preferred embodiment, comprises the further steps of providing a second packaged multilayer insulation blanket and installing it around the first multilayer insulation blanket so that the abutting edges of the second multilayer insulation blanket are offset from the abutting edges of the first multilayer insulation blanket.

The invention also relates to a packaged multilayer insulation blanket comprising (1) a multilayer insulation blanket including a plurality of alternating layers of heat-reflective foil and insulation spacer material, and (2) two layers of plastic sheeting sandwiching the multilayer insulation blanket therebetween, each layer having at least one edge, wherein the edge of the plastic sheeting is sealed to thus define an evacuated inside space containing the multilayer insulation.

Further objects, features and advantages of the present invention will become apparent from the detailed description of the preferred embodiments, when considered together with the attached figures of drawing.

DESCRIPTION OF PREFERRED EMBODIMENTS

Figure 1B:
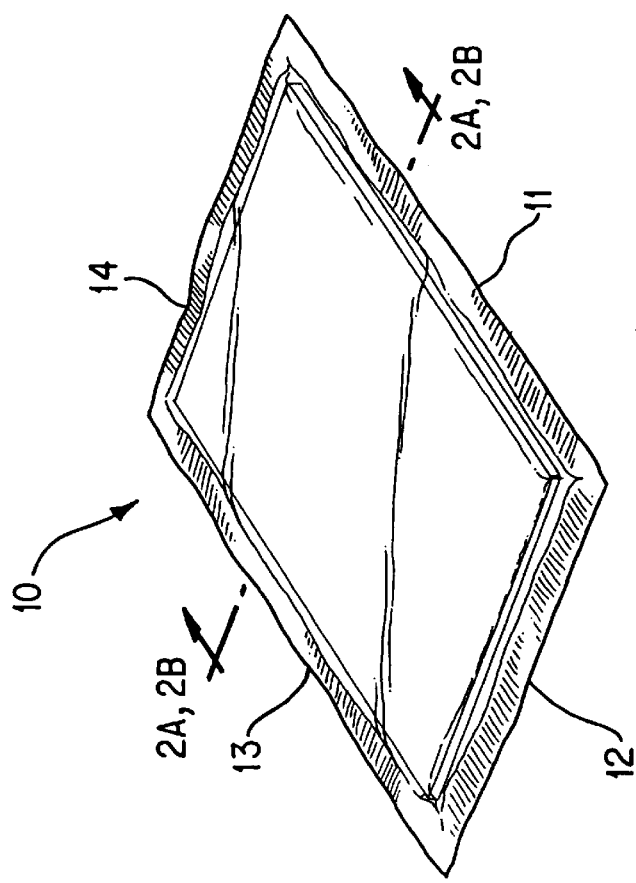
FIGS. 1A and 1B show the construction of the packaged multilayer insulation according to the present invention.

The invention will now be described with reference to a preferred embodiment, as shown in the Figures in which like reference numerals refer to like parts.

Figure 1A:
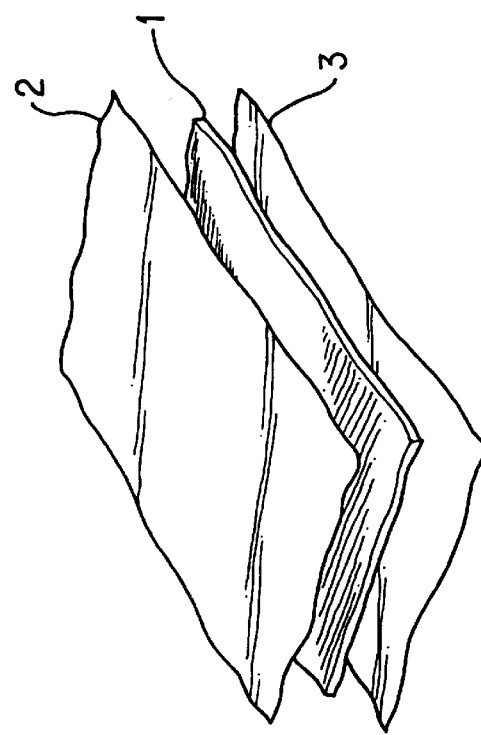

FIGS. 1A and 1B disclose the packaged multilayer insulation blanket according the present invention and a method of manufacturing the packaged blanket. The multilayer insulation blanket 1 is manufactured in a suitable, conventional manner, of multiple layers of heat-reflective foil 23 and low heat conductivity insulation spacer layers 22, made of suitable material such as microfiberglass insulation. These layers 22, 23 and their construction will be discussed in more detail with respect to FIGS. 2A and 2B below.

According to the present method of manufacturing a packaged multilayer insulation, a top sheet 2 of plastic sheeting and a bottom sheet 3 of plastic sheeting are disposed on either side of the multilayer insulation blanket 1. After the multilayer insulation is carefully disposed between the top and bottom sheets 2, 3, the edges 11, 12 and 13 of the plastic sheeting, which extend beyond the dimensions of the multilayer insulation blanket 1, are sealed in any appropriate manner, such as using adhesives or heat sealing. Heat sealing is preferable. Before the remaining edge 14 of plastic sheets 2, 3, is completely sealed, the space between the sheets 2 and 3 is preferably evacuated. While any suitable vacuum can be used, the vacuum is preferably about 100 torr. The evacuation of the inside space serves, among other things, the purpose of keeping the multilayer insulation compact and moisture free. In addition to, or instead of evacuation, the inside space of the packaging can be purged of air with an inert gas. Also desiccants can be added to the package, in addition to or instead of evacuation, to keep the blanket dry and facilitate any subsequent evacuation required during installation of the multilayer insulation.

After evacuation, the remaining of edge 14 is sealed to form a packaged multilayer insulation 10 in which the multilayer insulation blanket 1 is enclosed in the evacuated space between sheets 2 and 3. The package structure according to the invention allows the multilayer insulation blanket to be easily transported without damage, and without special containers or other treatment. It will be recognized that while FIGS. 1A and 1B disclose a rectangular multilayer insulation blanket 1, multilayer insulation blankets of any desired configuration can be packaged according to the present invention.

Figure 2A:
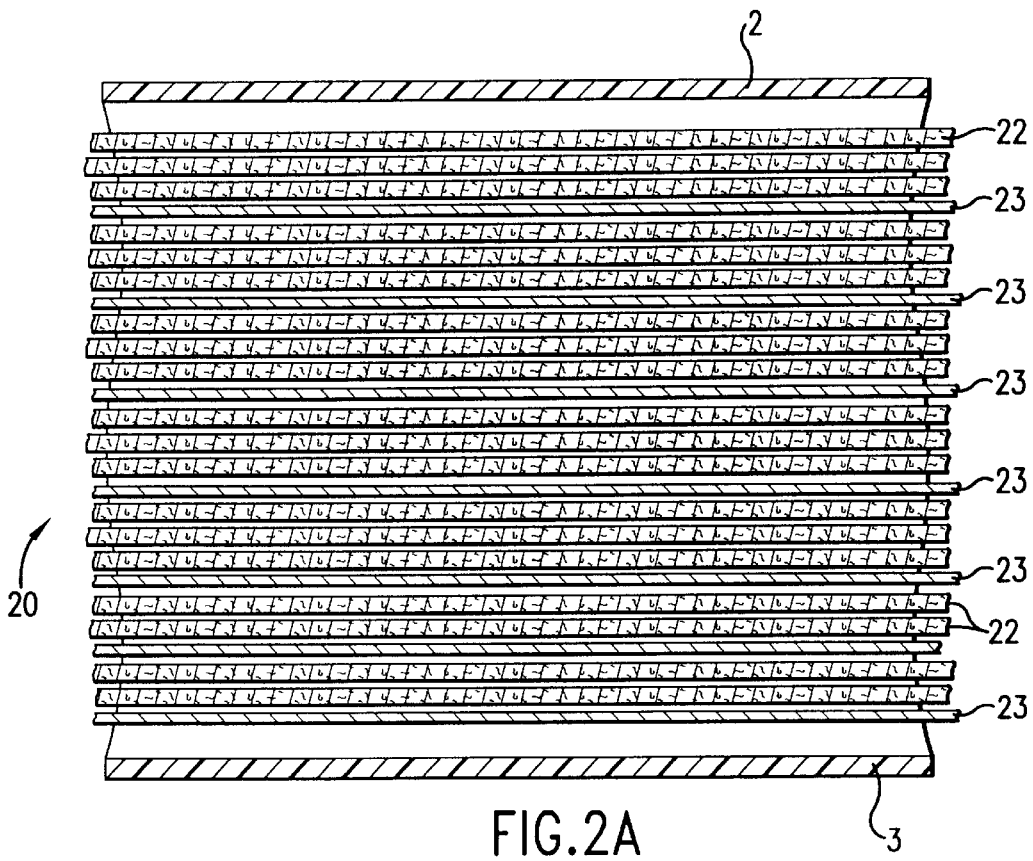
FIGS. 2A and 2B show the first and second multilayer insulation blankets used in the exemplified preferred embodiment of the present invention.
Figure 2B:
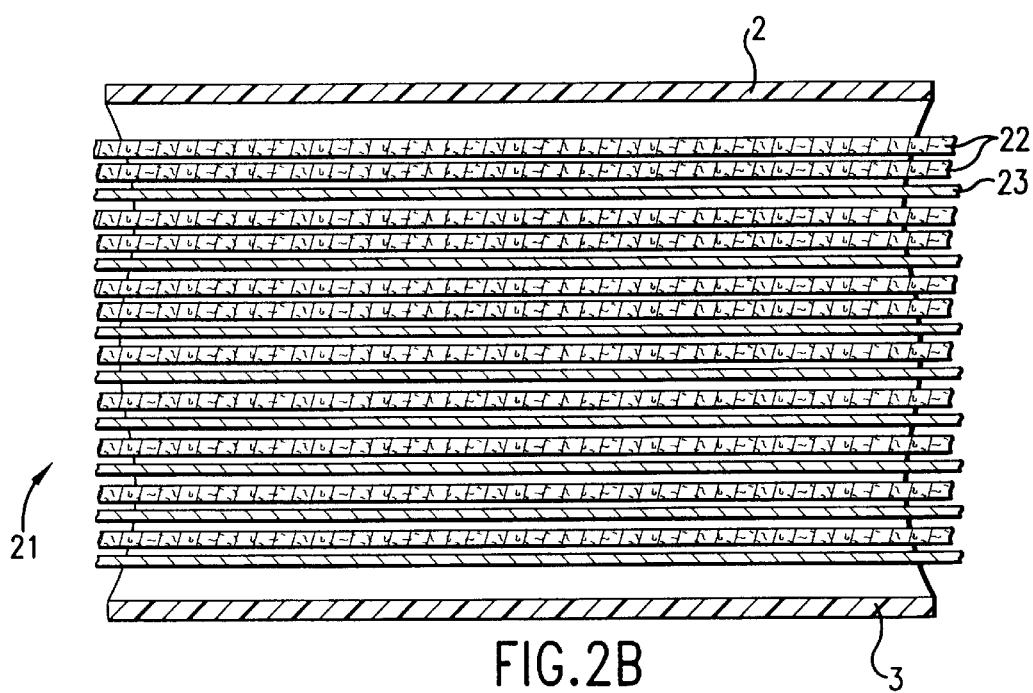

FIGS. 2A and 2B disclose first and second multilayer insulation blankets 20 and 21, respectively. Referring to FIG. 2A, spacer layers 22 are more numerous toward the top of FIG. 2A than toward the bottom of FIG. 2A. This variable density construction is, as stated above, intended to take advantage of the effect that the impact of radiation between barriers near a Dewar vessel's cold wall drops dramatically from the impact of radiation between radiation barriers near the vessel's warm wall. Thus, by making the multilayer variable insulation as shown in FIG. 2A, fewer layers of insulation can provide equivalent heat loss, thus saving both materials and space by making the overall insulation more efficient. While blanket 20 comprises 19 spacer layers 22, and 7 heat reflective foil layers 23, other configurations may be desirable, depending on the use to which the blanket 20 is put and the temperature of the member to be insulated.

FIG. 2A also shows plastic sheeting 2, 3, surrounding the multilayer insulation blanket 20 as it would appear in the packaged product.

FIG. 2B shows the second multilayer blanket 21 of the present invention. The second blanket has a similar variable density structure to the first blanket 20, in that the spacer layers 22 closer to the top of the figure are more numerous than at the bottom of the figure. The second blanket 21 comprises 11 spacer layers and 8 heat reflective foil layers 23, but other configurations can be used as required by a particular application. Generally, the heat reflective foil layers of blanket 21 are closer together and more numerous than the heat reflective foil layers of blanket 20. This structure is advantageous, because, in the illustrated embodiment, the first blanket 20 is intended to be closer to the cold wall of a Dewar container structure, and the second blanket 21 is intended to be closer to the warm wall of such a structure.

The low heat conduction insulation spacer layers 22 are preferably made of a paper of microfiberglass, ceramic paper or other suitable material. While there is some latitude in the fibers which make up the paper, the layers must be flexible so as to be accurately wrapped onto the container 30 (See FIG. 3) or other member. The fibers must retain the felting properties of the insulation at cryogenic temperatures. These requirements mean that the fibers are usually chosen from a limited group of fibrous materials. Natural inorganic fibrous material, such as asbestos, has been used in the past, and byproduct inorganic fibrous material, such as spun slag, has also been used. However, neither of these materials, or other like inorganic materials, are preferred in the method of the present invention. Organic materials are also not preferred for many uses because the spacer material must be oxygen compatible and many organic materials are flammable, oxidizable, or otherwise not oxygen compatible. Nonetheless, because the spacer layers are not subjected to the same kind of mechanical stress applied in the prior art orbital wrapping method, the variety of materials capable of being used in the present invention is greater than in the prior art.

In the present invention, while the spacer layer 22 is made of fibrous material, as in the prior art, that fibrous material, in combination with the heat-reflective foil, must be capable of retaining the feltlike structure of insulation even at very low temperatures, such as, for example, the temperature of liquid helium (4.2° K.), hydrogen (20.4° K.) or oxygen (90.2° K.). However, the method according to the present invention can also be used to insulate hot members up to about 660° C.

The spacer layer 22 should have a thickness of about 0.0025 in. to about 0.0035 in. to ensure both sufficient strength to allow the constructed multilayer insulation blanket to have sufficient flexibility for wrapping onto the container and to ensure the above-noted functionalities at cryogenic temperatures.

It is preferred that the fibrous material is a microfiberglass, and it is most preferred that the microfiberglass is borosilicate glass. While there is some latitude in the diameter of the glass, especially when the microfiberglass is borosilicate glass, it is preferred that the microfiberglass has an average diameter range of between about 0.3 to 10 microns, especially about 0.5 to 4 microns, for example, about 0.75 to 1.5 microns.

The fiber length should also be short, for example, less than about 2 mm, especially less than 1 mm, for example, between 0.1 and 1 mm. One particularly suitable material for the heat spacer layer 22 is comprised of unbonded glass fibers and manufactured by the Lydall Manning Company in Troy, NY, and sold under the CRYOTHERM trademark. One especially preferred material is CRYOTHERM 243. Another particularly preferred material is ceramic fiber paper material manufactured, such as the ceramic fiber paper of high-purity alumina-silica paper manufactured by the Lydall Manning Company in Troy, N.Y., and sold under the LYTHERM trademark.

While certain organic fibers, for example, polyester fibers, can function in cryogenic applications, as stated above, it is preferred that combustible organic fibers not be used in cryogenic applications, since cryogenic tanks often contain combustible or oxidizing liquefied gases.

Likewise, there is some latitude for the heat reflective foil 23 of the multilayer insulation blankets 20, 22 according to the present invention. The most satisfactory materials for the heat reflective foil are metal foil, such as copper stainless steel or aluminum foil, or double aluminized Mylar (DAM). When the aluminum foil or other suitable material has a thickness of about 0.00025 to about 0.0015 in., the foil has both the strength and flexibility to be applied in the manner according to the method of the present invention without breaking, tearing, wrinkling, or the like, and to function properly at cryogenic temperatures. Because the multilayer insulation of the present invention uses a prefabricated structure, much thinner aluminum foil layers having thicknesses as small as 0.000285" can be used without tearing. If aluminum foil is used, the aluminum foil preferably has a "0" temper.

Figure 4:
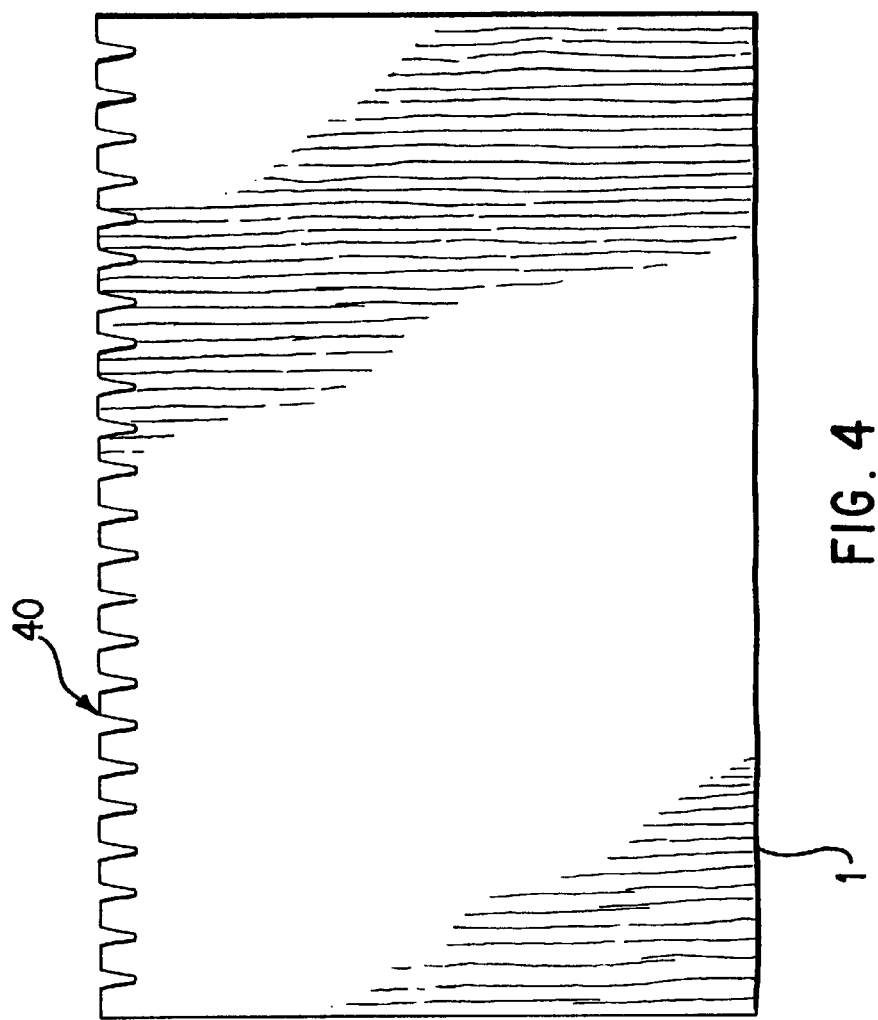
FIG. 4 shows a plan view of the multilayer insulation blanket according to the present invention.

FIG. 4 illustrates a plan view of the multilayer insulation blanket 1 in which cut out portions 40 are provided to allow the multilayer insulation to be folded over the edge of the top of a container to be insulated. It will be recognized by one of ordinary skill in the art that cutouts 40 could be provided on both edges of the blanket to allow the blanket to be folded over at either end of a container, or to be cut out in any other desirable way to compensate for the geometry of the container or other member to be insulated.

Figure 3:
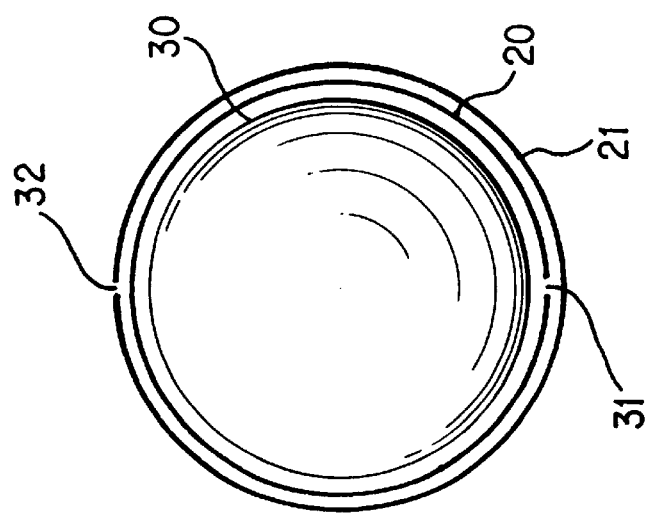
FIG. 3 shows first and second multilayer insulation blankets installed on a container according to the present invention.

FIG. 3 is a schematic view showing first multilayer insulation blanket 20 and second multilayer insulation blanket 21 installed around container 30. It should be noted that the seam 31 at which the edges of multilayer blanket 20 abut is offset from the seam 32 of multilayer insulation blanket 21 in order to prevent heat leakage. The installation of multilayer insulation blanket 20 and 21 around a container 30 will now be described with reference to FIGS. 5 and 6.

A packaged insulation layer blanket 10 containing multilayer insulation blanket 20 is transported to the site of a container 30 to be insulated. An edge 14 of the packaged insulation 10 is opened and one edge 61 of multilayer insulation blanket 20 is attached to container 30 by tape, adhesive, or other suitable means. Multilayer insulation blanket 20 is then carefully guided out from between plastic sheets 2 and 3 and onto or around container 30. After the multilayer insulation blanket 20 has been completely guided around tank 30 and edges 61 and 62 abut, the edges are fastened in any suitable manner such as adhesive or heat-reflective tape 60. The installation is completed so that adjacent heat reflective foil layers 23 do not touch so as to create "heat shorts." It will be appreciated that the present method is superior to prior art orbital or spiral wrapping methods because of its ease and quickness. A container or other member can be insulated according to the method of the present invention with a 75% savings in time by persons not having any specialized skill or training.

Figure 5:
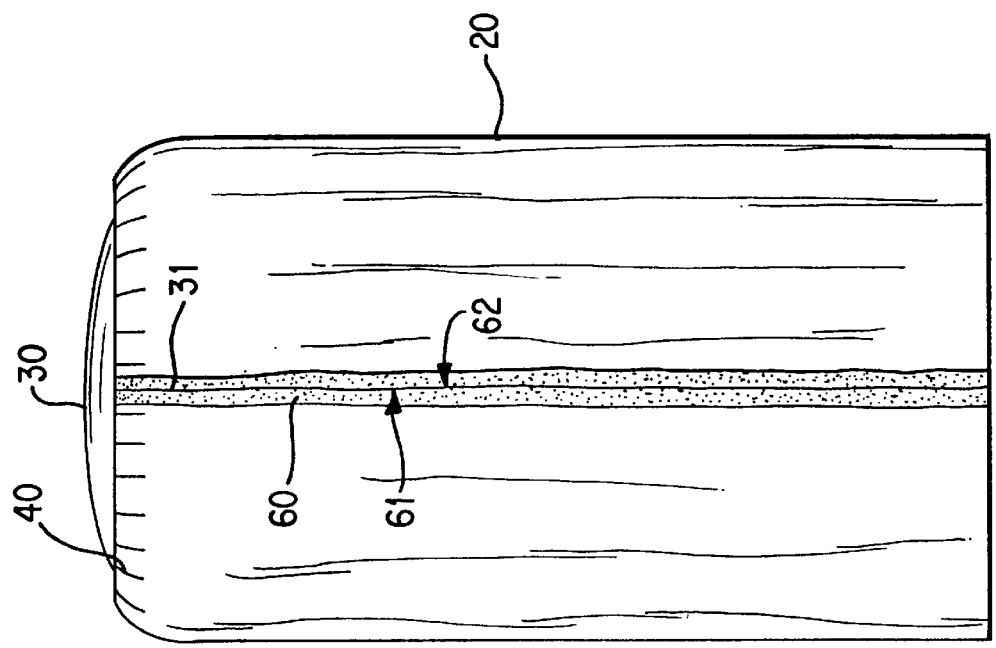
FIG. 5 is a cross-sectional view through an insulated tank insulated with variable density multilayer insulation according to the method of the present invention.
Figure 6:
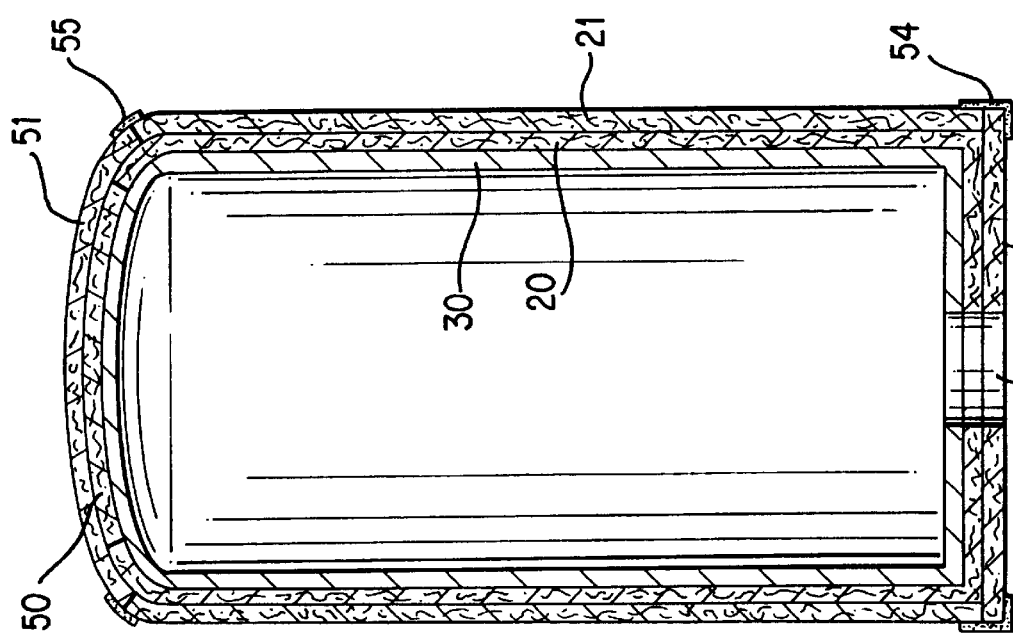
FIG. 6 is a side view of a tank according to the present invention in which the first multilayer insulation blanket has been installed, but the top or second multilayer insulation blankets have not yet been installed.

FIG. 5 shows container 30 after it has been completely insulated by multilayer blankets 20 and 21. It will be noted that a top circular plug 50 of multilayer insulation equivalent in construction and thickness to multilayer insulation blanket 20 is installed on the top of container 30 and attached in a suitable manner, such as with reflective tape.

Thereafter, multilayer insulation blanket 21 is installed around multilayer insulation blanket 20 in the manner described and shown in FIG. 3. After installation of multilayer insulation blanket 21, a second top plug 51 is installed on top of plug 50 and attached to top edges of blanket 21 with suitable means such as reflective tape 55. In this embodiment, the bottom edge of blanket 20 is folded underneath the bottom of tank 30 until it abuts outlet structure 52. A circular plug 53 is provided for the bottom of the tank having a configuration suited to surround outlet structure 52 and abut the bottom edges of blanket 21.

Figure 7B:
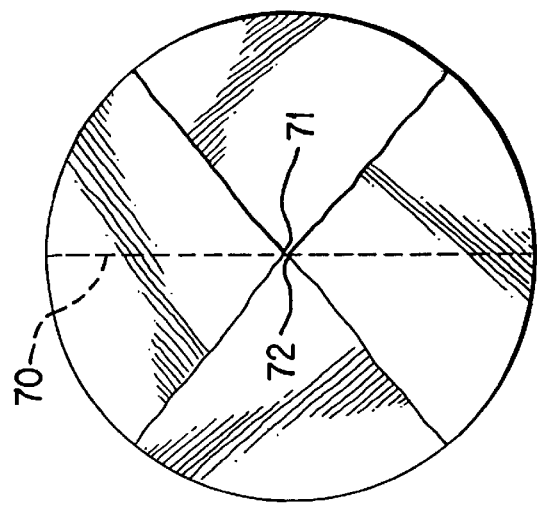
FIGS. 7A and 7B show, by means of top views of the end of a tank, an alternative method of insulating the end of a tank with the method according to the present invention.
Figure 7A:
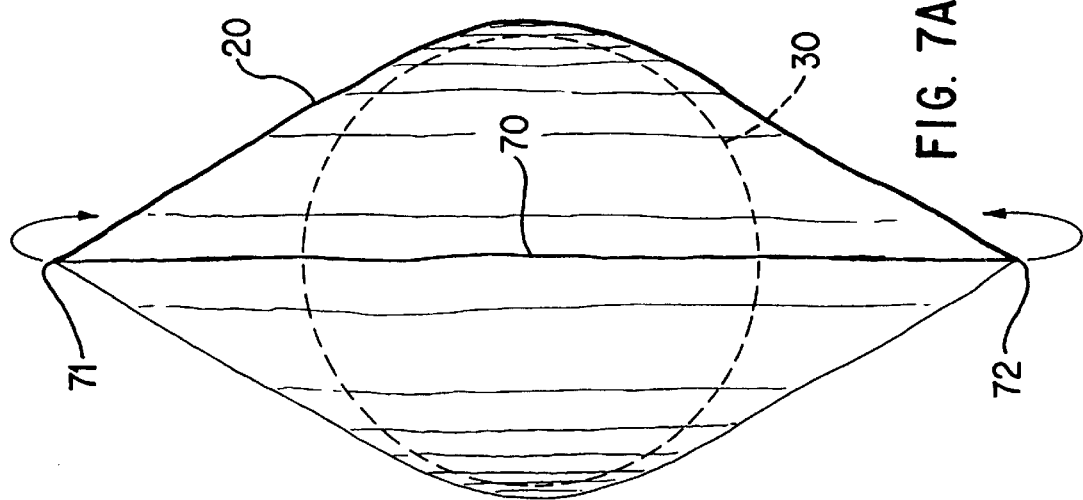

FIGS. 7A and 7B show an alternative embodiment of the method of the present invention in which the end of a container 30 is insulated by folding over an excess of multilayer insulation blanket 20 (or 21, or both) is folded over to cover the end of container 30 and abut in seam 70. The resulting pointed, folded ends 71, 72 are then folded over as shown in FIG. 7B. The method of this embodiment also ensures that the container 30 is insulated with any resulting "heat shorts" in the blanket 20 or 21.

According to the present invention, the method can be used to insulate container 30, or to insulate a Dewar structure in which container 30, as insulated by blankets 20 and 21 is disposed inside a further container (not shown). One of skill in the art will also appreciate that the method according to the present invention can be used to insulate any other cryogenic or extreme temperature member such as a cryogenic pipe, a cryogenic superconducting electricity distribution element or superconducting magnet, etc. As stated above, the method can also be used to insulate high temperature vessels or members.

As discussed above, the present invention has a number of significant advantages over the prior art. The method greatly reduces the installation time of insulation, particularly oxygen compatible, variable density, multilayer insulation for cryogenic purposes. The method allows prefabrication of oxygen compatible multilayer insulation blankets in any desired configuration. The method of the present invention, particularly the packaged multilayer insulation blanket, prevents the individual layers of the multilayer insulation from shifting during handling and installation. The packaging protects the multilayer insulation from possible contamination and damage during shipping, storage, and installation. The method using the packaged multilayer insulation according to the present invention eliminates thermal shorting due to mechanical fastening, for example, tag pins or stitching. Lastly, the packaged multilayer insulation blanket according to the present invention allows the prefabrication and easy application of multilayer insulation with variable layer density, a result which is not easily achieved with the standard spiral or orbital vessel wrapping process. As is known in the art, variable layer density multilayer insulation is more efficient and allows fewer layers of insulation for equivalent heat loss.

While the present invention has been illustrated by means of a preferred embodiment, one of ordinary skill in the art will recognize that modifications, amendments, additions, and substitutes and deletions can be made while remaining within the scope and spirit of the present invention as defined by the appended claims.

What is claimed is:

1. A method of insulating a member with multilayer insulation, comprising the steps of(a)
   (a) providing a packaged multilayer insulation blanket including:
      (1) a multilayer insulation blanket including a plurality of alternating layers of heat reflective foil and insulation spacer material, a number of layers of insulation spacer material between layers of heat reflective foil varying throughout a cross-section of the multilayer insulation blanket, said multilayer insulation blanket including a first edge and a second, opposite edge; and
      (2) two layers of plastic sheeting sandwiching the multilayer insulation blanket therebetween, each layer having at least one edge, wherein the edge of the plastic sheeting is sealed to thus define an inside space containing the multilayer insulation blanket;
   (b) opening an edge of the packaged insulation and attaching the first edge of the multilayer insulation blanket to the member;
   (c) guiding the multilayer insulation blanket onto the member until the first edge and the second edge of the multilayer insulation blanket abut; and
   (d) attaching the abutting edges of the multilayer insulation blanket.

2. A method according to claim 1, wherein said step (b) comprises attaching said first edge of the multilayer insulation to the member with heat reflective tape in a manner calculated to avoid heat shorts.

3. A method according to claim 1, wherein said step
   (d) comprises attaching the abutting edges of insulation with heat reflective tape in a manner calculated to avoid heat shorts.

4. A method according to claim 1, wherein the inside space is evacuated.

5. A method according to claim 1, wherein the inside space is purged of air.

6. The method according to claim 1, wherein said step (c) comprises wrapping the multilayer insulation blanket circumferentially around the member, and arranging the abutting edges to extend in an axial direction of the member.

7. The method according to claim 1, wherein said step (a) comprises providing said two layers of plastic sheeting extending beyond edges of the multilayer insulation blanket, and sealing said two layers in face-to-face relationship.

8. The method according to claim 1, further comprising the steps of:
providing a circular plug of multilayer insulation blanket;
installing the circular plug to a top of the member; and
folding a bottom edge of the multilayer insulation blanket onto a bottom of the member.

9. A method according to claim 1, wherein the member is a cryogenic container.

10. A method according to claim 9, wherein the container is an inner container of a Dewar structure having an inner container, an outer container and an evacuated space therebetween.

11. A method according to claim 1, wherein the heat reflective foil is aluminum foil.

12. A method according to claim 11, wherein the insulation material is microfiberglass insulation.

13. A method according to claim 1, wherein the heat reflective foil is copper foil.

14. A method according to claim 13, wherein the insulation material is ceramic paper insulation.

15. A method according to claim 1, further comprising the steps of:
(e) providing a second packaged multilayer insulation blanket including:
  (1) a second multilayer insulation blanket including a plurality of alternating layers of heat reflective foil and insulation material, said second multilayer insulation blanket including a first edge and a second opposite edge; and
  (2) two layers of plastic sheeting sandwiching the multilayer insulation blanket therebetween, each layer having at least one edge, wherein the edge of the plastic sheeting is sealed to thus define an inside space containing the second insulation blanket;
(f) opening an edge of the second packaged insulation blanket and attaching the first edge of the second insulation blanket to the first insulation blanket;
(g) guiding the second insulation blanket onto the first insulation blanket until the first edge and the second edge of second insulation blanket abut; and
(h) attaching the abutting edges of second insulation blanket, wherein the abutting edges of the second insulation blanket are offset from abutting edges of the first insulation blanket.

16. A method according to claim 15, wherein the heat reflective foil is aluminum foil.

17. A method according to claim 15, wherein the inside spaces are evacuated.

18. A method according to claim 15, wherein the inside spaces are purged of air.

19. The method according to claim 15, wherein said steps (c) and (g) comprise wrapping the multilayer insulation blankets circumferentially around the member, and arranging the abutting edges of the multilayer insulation blankets to extend in an axial direction of the member, respectively.

20. The method according to claim 15, wherein said steps (a) and (e) comprise providing said two layers of plastic sheeting extending beyond respective edges of the multilayer insulation blankets, and sealing said two layers in face-to-face relationship, respectively.

21. The method according to claim 15, wherein a number of layers of insulation spacer material between layers of heat reflective foil varies throughout a cross-section of each of the multilayer insulation blankets.

22. The method according to claim 15, further comprising the steps of:
providing circular plugs of the multilayer insulation blankets;
installing the circular plugs to a top of the member;
folding a bottom edge of the first multilayer insulation blanket onto a bottom of the member; and
installing a circular plug of the second multilayer insulation blanket over the folded edge of the first multilayer insulation blanket on the bottom of the member.

23. A method according to claim 15, wherein the member is a cryogenic container.

24. A method according to claim 23, wherein the member is an inner container of a Dewar structure having an inner container, an outer container and an evacuated space therebetween.

25. A method according to claim 15, wherein the heat reflective foil is copper foil.

26. A method according to claim 25, wherein the insulation material is microfiberglass insulation.

27. A method according to claim 25, wherein the insulation material is ceramic fiber paper insulation.

* * * * *